US008972345B1

(12) United States Patent
Aguilera (10) Patent No.: US 8,972,345 B1
(45) Date of Patent: Mar. 3, 2015

(54) MODIFYING DATA STRUCTURES IN DISTRIBUTED FILE SYSTEMS

(75) Inventor: Marcos K. Aguilera, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2140 days.

(21) Appl. No.: 11/527,877

(22) Filed: Sep. 27, 2006

(51) Int. Cl.
*G06F 7/00* (2006.01)

(52) U.S. Cl.
USPC ............................ 707/615; 707/758; 711/118

(58) Field of Classification Search
USPC .......... 707/104.1, 10, 100, 999.106, 999.203; 711/118
See application file for complete search history.

(56) References Cited

U.S. PATENT DOCUMENTS

| | | | |
|---|---|---|---|
| 7,293,143 B1* | 11/2007 | Shavit et al. | 711/147 |
| 2007/0136365 A1* | 6/2007 | Tarditi et al. | 707/103 R |
| 2007/0233710 A1* | 10/2007 | Passey et al. | 707/100 |

OTHER PUBLICATIONS

Wang, Randy, xFS: A Wide Area Mass Storage File System, Proceedings of the Fourth Workshop on Workstation Operating Systems, pp. 71-78 Oct. 1993 Also appeared as University of California.
Braam, Peter J., The Coda Distributed File System, Linux Journal, Jun. 1998.
Gibson, Garth, A Case for Network-attached Secure Disks, Technical Report CMU-CS-96-142, Carnegie Mellon University, School of Computer Science Sep. 1996.
Howard, John H., An Overview of the Andrew File System, In Proceedings of the USENIX Winter Technical Conference, pp. 23-26, Feb. 1988.
Howard, John H., Scale and Performance in a Distributed File System, ACM Transactions on Computer Systems, 6(1):51-81, Feb. 1988.
Kazar, Michael L., Synchronization and Caching Issues in the Andrew File System, In Proceedings of the USENIX Winter Technical Conference, pp. 27-36 Feb. 1, 1988.
Koeninger, Kent, CXFS: A Clustered SAN Filesystem from SGI, SGI Software, Apr. 1999.
Lee, Edward K., Petal: Distributed Virtual Disks, In Proceedings of the International Conference on Architectural Support for Programming, Languages and Operating Systems pp. 84-92 Cambridge MA.
Lu,Qi and Mahadev Satyanarayanan, Isolation-only Transactions for Mobile Computing, Operating Systems Review, 28(2): 81-87, 1994.
Lu, Qi and Mahadev Satyanarayanan, Improving Data Consistency in Mobile Computing Using Isolation-only Transactions, In Proceedings of the Fifth IEEE HotOS Topics Workshop, May 1995.
MacDonald, Joshua, Reiser4 Transaction Design Document, Technical Report, Namesys, 6979 Exeter Dr., Oakland, CA 94611, Apr. 2002.
Olson, Michael, The Design and Implementation of the Inversion File System, USENIX Winter, pp. 205-218, 1993.

(Continued)

*Primary Examiner* — Hosain Alam
*Assistant Examiner* — Eliyah S Harper
(74) *Attorney, Agent, or Firm* — Law Office of Philip Lyren; Philip Scott Lyren (57) ABSTRACT

Embodiments include methods, apparatus, and systems for modifying data structures in distributed file systems. One method of software execution includes using minitransactions that include a set of compare items and a set of write items to atomically modify data structures in a distributed file system.

19 Claims, 4 Drawing Sheets

(56) References Cited

OTHER PUBLICATIONS

Satyanarayanan, Mahadev, Scalable, Secure, and Highly Available Distributed File Access, IEEE Computer, 23(5):9-18,20-21, May 1990.

Satyanarayanan, Mahadev, Coda: A Highly Available File System for a Distributed Workstation Environment. IEEE Transactions on Computers, 39(4):447-459. Apr. 1990.

Shepler, Spencer, NFS Verson 4 Protocol, Request for Comment RFC 3010, Network Working Group, RFC Editor, Dec. 2000.

Thekkath, Chandramohan, Frangipani: A Scalable Distributed File System, Proceedings of the ACM Symposium on Operating Systems Principles pp. 224-237 Oct. 1997.

Tivoli, Tivoli SANergy: Helping You Reach Your Full SAN Potential. http//www.tivoli.com/products/documents/-datasheets/sanergy_ds.pdf.

Wang, Randy, xFS: A Wide Area Mass Storage File System, Proceedings of the Fourth Workshop on Workstation Operating Systems, pp. 71-78 Oct. 1993. Also appeared as University of California.

* cited by examiner

MODIFYING DATA STRUCTURES IN DISTRIBUTED FILE SYSTEMS

BACKGROUND

Distributed file systems distribute files over a network. Unlike network file systems, distributed file systems do not rely on a central server to access files and thus have improved scaling and fault tolerance.

Concurrent access is one challenge in designing distributed file systems. Concurrent access occurs when two or more computers attempt to access the same file or data structure at the same time. For example, if two host computers are trying to create a file in the same directory, the hosts can garble the directory structure if the directory is not properly updated.

Various different solutions to coordinate access to data structures have been developed in an attempt to mitigate problems associated with concurrent access in distributed file systems. One solution uses locks and leases. In order to access data, a host must acquire a lock or a lease. Since only one lock or lease is granted at a time, conflicting access with another host is avoided. Other solutions include using home hosts (the file system assigns a home or owner computer to coordinate data access), using synchronization primitives available in tightly-coupled cluster file systems (hosts share communication buses, input-output devices, and/or memory), and using databases and transaction processing systems (the file system uses transactions to access data).

These prior solutions and others have shortcomings associated with concurrent access in distributed file systems. For instance, some of these solutions experience one or more of deadlocks, overloads, disruptions to data access, insufficient fault tolerance, exclusions for simultaneous access, and slow processing, to name a few examples.

DETAILED DESCRIPTION

Embodiments in accordance with the present invention are directed to apparatus, systems, and methods for modifying data structures in distributed or cluster file systems and coordinating concurrent access in distributed or cluster file systems. A lightweight type of transaction, called a minitransaction, operates on data structures in the distributed file system. Minitransactions are serializable and ensure that concurrent accesses maintain data consistency. As discussed in more detail, the minitransactions are narrow and limited enough in function to be efficient. At the same time though, they are general and powerful enough to be useful for a distributed or cluster file system. Further, embodiments in accordance with the present invention entail various aspects on how to use minitransactions to coordinate access within the distributed or cluster file system. For instance, exemplary embodiments include how the file system data structures are arranged so they operate with minitransactions, and when and how minitransactions operate on these data structures.

Concurrent access in the distributed file system and use of minitransactions are explained in the context of an exemplary shared storage system (SSS). Embodiments, however, are not limited to such a SSS but include any infrastructure wherein minitransactions are used.

In general, the SSS includes a set of storage nodes that provide a place to store data so the data is addressable through an address. Data in this space is updated with minitransactions, a lightweight type of transaction that does not incur the overheads of more general transactions in a database system. Minitransactions enable atomic modification of parts the stored data conditioned on the contents of the parts of the stored data. Minitransactions are a generalization of a multi-word compare-and-swap operation that atomically performs an equality comparison of many virtual addresses against constants and, if successful, results in updating multiple virtual addresses. More precisely, a minitransaction has a set of compare items and a set of update or write items. Both sets of items have a storage node identifier, an address within the storage node, data, a length of data. The semantics of a minitransaction are that, for each compare item, its data is compared for equality against the address specified in the item within the storage node. If the comparison of all items succeeds, then for each of the update items, its data is copied into the address specified in the item within the storage node specified in the item.

File system data is updated using minitransactions and stored in the address space that is managed by the SSS. In one exemplary embodiment, the storage space is divided into four regions: a superblock region, a free-block bitmap region, an inode list region, and a file data region. The file data region is further subdivided into blocks of a standard size, for example 4096 bytes.

The superblock region stores static information about the file system, including the volume name, data block size, number of blocks, and number of inodes. The free-block bitmap region stores a bitmap that indicates whether each block in the file data region is currently in use. The inode list region stores the contents of each inode and includes various timestamps (creation time, last modification time, last access time), permissions, data size, and the first block of the chaining list. Lastly, the file data region stores data contents of inodes and chaining lists.

A chaining list keeps track of the block numbers that comprise a file, not including the chaining list itself. In one exemplary embodiment, the chaining list is encoded using a linear scheme: The chaining list is stored in locations that include pointers referencing other locations. In alternate embodiments, more complex and efficient schemes encode the chaining list (example, in a hierarchical manner to support large files).

For a computing device (example a host computer) to perform file system operations, the host uses a minitransaction to modify the data structures. Minitransactions ensure that if another host is attempting conflicting modifications through another minitransaction, then one of the minitransactions will abort and prevent an inconsistent update. For example, supposes that two hosts are trying to create a new file. This process involves allocating a new inode, allocating a new entry in a directory, and linking the inode to the directory entry. In order to perform these tasks, hosts pick a free inode and directory entry and issue a minitransaction that (1) tests if the inode and directory entry remain free, (2) marks the inode and directory entry as being used, and (3) populates the inode and the directory entry. The first portion is performed with the comparison part of the minitransaction, while the second and third portions are performed with the update part of the minitransaction. If both hosts attempt to allocate the same free inode, then one of the minitransaction will fail the test under portion (1) because of the serializability of the minitransactions. Thus, minitransactions protect hosts from conflicting updates to the file system data structures.

For performance, each host has a cache of metadata and possibly data. In one exemplary embodiment, the caching scheme is optimistic in that cached data becomes stale without being immediately invalidated. When a host performs a file system operation that relies on cached data, the host uses the compare items in a minitransaction to validate its cached data. The minitransactions will abort if the cached data is out of date. For example, suppose that a host has an inode in its cache and attempts to modify its access permission. In order to perform this modification, the host issues a minitransaction that (1) compares its cached entry with the real contents of the SSS and (2) if the comparison succeeds, modifies the access permission as desired. This minitransaction will abort if the cached inode becomes stale. In this case, the host reloads the inode and, if appropriate, retries the transaction with the new information.

In one exemplary embodiment, cached data includes a full list of inodes and the contents of recently accessed directories. Further, when the size of a cached data is relatively large, a version number is compared instead of the whole data. In one exemplary embodiment, inodes have a version number (i.e., an iversion) that gets modified every time the inode changes. Then, rather than comparing the contents of the entire inode, the minitransaction only compares the iversion. The minitransaction also ensures that the iversion is incremented whenever the inode is changed. Incrementing is accomplished by including an update to the iversion in the minitransaction that updates the inode.

In one exemplary embodiment, the mode also includes another version number, called a dversion. The dversion is a number that gets incremented whenever the data contents of an inode change. For example, data content for a directory inode consists of a list of file names and inode numbers, while the data content for a regular file inode consists of the contents of the file. In the case of a directory inode, the dversion of the inode changes whenever the list of the file names and inode numbers changes; and in the case of a regular file inode, the dversion of the inode changes whenever the file contents change. In one exemplary embodiment, the dversion and iversion change at different times. The iversion is incremented when the inode itself changes (example, due to an attribute change), and the dversion is incremented when the data content of the inode changes (example, due to a directory changing or a regular file changing its content). Further, dversions are useful in caching the contents of files, including directories. A host with cached data uses the dversion to validate its cache by adding a compare item to a minitransaction.

FIGS. 1-4 are now discussed to provide a more detailed discussion of exemplary embodiments in accordance with the present invention.

Figure 1:
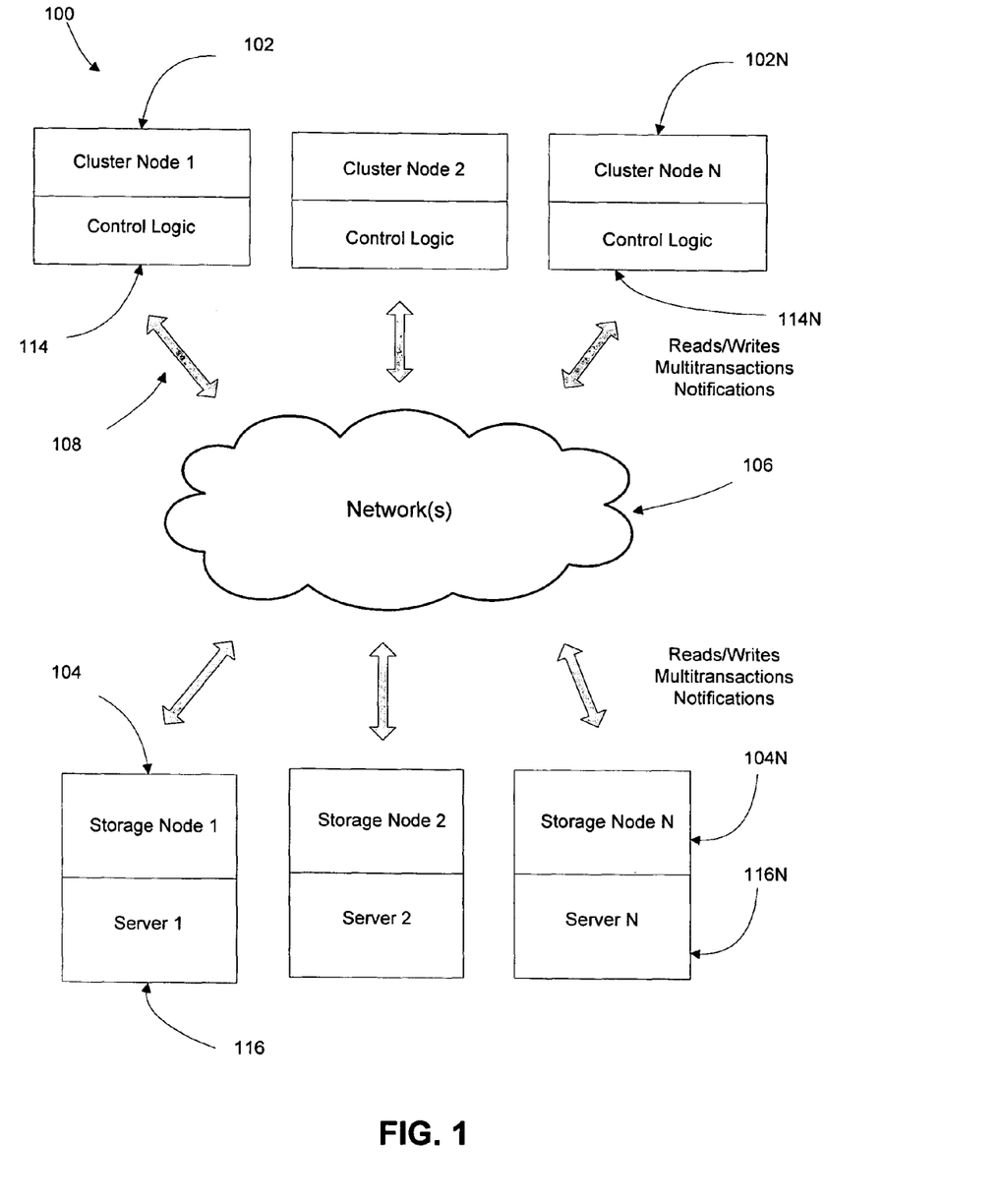
FIG. 1 is an exemplary block diagram for a transaction shared storage system in accordance with an exemplary embodiment of the present invention.

FIG. 1 is a block diagram of an exemplary distributed or cluster file system or shared storage system (SSS) 100 in accordance with an exemplary embodiment. The SSS 100 includes a plurality of application or cluster nodes 102 (of which node 1 to node N are exemplary) and a plurality of storage nodes 104 (of which node 1 to node N are exemplary) interconnected by one or more networks 106.

The cluster nodes 102 are computers or systems used by a human operator or by some software system. More specifically, cluster nodes 102 are systems that are capable of and intended for use in processing application software (i.e., one or more programs designed for end users and/or for other programs).

Storage nodes 104 are network attached devices providing random access memory (RAM) and/or disk space (for storage and as virtual RAM) and/or some other form of storage such as tapes, micromechanical systems (MEMS), optical disks or the like, for use by the cluster nodes 102 in processing applications. Typically, the storage nodes have larger amounts of RAM and/or disk space than the cluster nodes 102. In some embodiments, storage nodes also include more specialized devices, such as network disk drives or disk drive arrays, (example, redundant array of independent disks (RAID)), high speed tape, magnetic random access memory (MRAM) systems or other devices, and combinations thereof.

Moreover, whereas in a shared storage system or a distributed shared storage system the networked nodes are not differentiated to be either cluster nodes or storage nodes, as implied by the figures, storage nodes 104 and cluster nodes 102 are distinct in at least one embodiment. In other words, in at least one embodiment, the cluster nodes 102 and storage nodes 104 are discrete elements. In certain embodiments, at least some cluster nodes 102 and storage nodes 104 are co-located, such as in a rack or even within the same system box. However, it is understood and appreciated that at least one cluster node 102 is logically separate from at least one other storage node 104. Further, in at least one embodiment, at least one cluster node 102 is physically separate from at least one storage node 104.

The SSS also includes one or more transaction controllers to manage or permit atomic interaction between the cluster nodes 102 with the storage nodes 104. Atomic transactions are guaranteed to have either of two outcomes: either complete success (commit) or complete failure (rollback). Thus, when multiple processes attempt to perform conflicting atomic transactions simultaneously, their atomic nature guarantees that the transactions that succeed are serializable, meaning that they appear to execute one after the other without intermingling. Guaranteeing atomic transactions frees the programmer from concerns over partial updates occurring, which leads to corruption or data and/or an errant view of the data.

In addition, in at least one embodiment, each cluster node 102 addresses the collective memory pool established by the plurality of storage nodes 104 as a linear memory address space. For instance, the transaction controller provides two routines: a batched transaction routine, and a notification routine. The batched transaction routine assembles batched transaction instruction sets that permit atomic interaction between the cluster nodes 102 and the storage nodes 104. So as to permit independent operation of the plurality of cluster nodes 102 without need for a centralized controller or gateway, multiple instantiations of the batched transaction routine and the notification routine are established within SSS 100 at any given time.

In at least one embodiment, the transaction controller is implemented as a method stored on a computer-readable medium as a computer program. The form of the medium and the language of the program are understood to be appropriate for the cluster nodes 102 and storage nodes 104.

When executed in the SSS 100, transactions are implemented in the shared storage environment. In one exemplary embodiment, the transaction controller includes control logic 114 that is available to the applications at the cluster nodes 102 and a server 116 that runs on the storage nodes 104. For example, in one embodiment the control logic 114 is implemented as a user library; and in another embodiment, the control logic is implemented in an operating system kernel, and/or implemented in hardware.

The control logic 114 implements the ability for cluster nodes 102 to establish batched transaction instruction sets through the batched transaction routine. This logic also tracks storage node configuration and provides support for recovery. The server 116 reacts to batched transaction instruction sets as established by a cluster node 102 via the control logic 114.

In at least one embodiment, the storage nodes 104 are passive entities that simply wait for requests from the cluster nodes 102. The storage nodes 104 are made fault tolerant by using existing replication, disk logging, and disk imaging systems and methods. Replication provides high availability when few storage nodes 104 crash, and the maximum number of storage node crashes tolerated in SSS 100 depend on the degree of replication. Further, disk imaging/logging are techniques well understood and employed in traditional database systems. One or both techniques are borrowed in SSS 100 in at least one embodiment, to provide data durability when many (potentially all) storage nodes 104 crash due to power failures or similar correlated failures. With disk logging for example, the log is written sequentially and disk bandwidth is used efficiently. Specifically, during idle periods, the log file is flushed into a disk image of the memory.

In one exemplary embodiment, each storage node 104 provides a sequence of raw or uninterrupted words of a predetermined standard size, such as for example eight, thirty-two or sixty-four bits, or five hundred twelve bytes. Each storage node 104 also has an allocation space for management data, such as the data needed by or used by the server 116.

It is understood and appreciated that there are different ways to organize the address space. For example, words are organized as an address space and utilize a linear address space that is an integer range. Within SSS 100, data is globally referenced by an address pair, such as for example, (mem-id, address), where "mem-id" is the identifier of a specific storage node 104 (e.g., a specific storage node host name or identifier) and "address" is a number within the address space of the specified storage node 104 (e.g., storage node 104A). For an embodiment wherein the storage nodes 104 provide an equivalent of RAM or virtual RAM, including but not limited to traditional RAM, DRAM, SRAM, FRAM, MRAM or virtual RAM, the address range is generally understood to be treated as a conventional memory address range. In an alternative embodiment wherein the storage nodes 104 provide storage in the form of a disk or array of disks operating as neither RAM nor virtual RAM, the address range is understood and appreciated to refer to a disk block or range of disk blocks.

Figure 2:
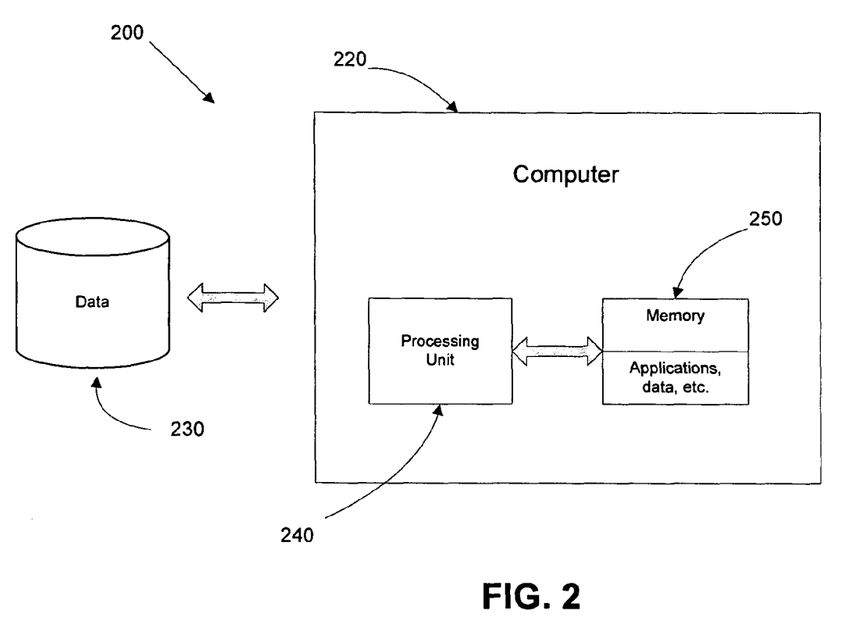
FIG. 2 is a block diagram of an exemplary computer system in accordance with an exemplary embodiment of the present invention.

Embodiments in accordance with the present invention are utilized in or include a variety of systems, methods, and apparatus. FIG. 2 illustrates an exemplary embodiment as a computer system 200 for utilizing one or more of the cluster nodes, storage nodes, methods, flow diagrams and/or aspects of exemplary embodiments in accordance with the present invention.

The system 200 includes a computer system 220 (such as a host or client computer) and a repository, warehouse, or storage system 230. The computer system 220 comprises a processing unit 240 (such as one or more processors of central processing units, CPUs) for controlling the overall operation of memory 250 (such as random access memory (RAM) for temporary data storage and read only memory (ROM) for permanent data storage). The memory 250, for example, stores applications, data, control programs, algorithms (including diagrams and methods discussed herein), and other data associate with the computer system 220. The processing unit 240 communicates with memory 250 and data base 230 and many other components via buses, networks, etc.

Embodiments in accordance with the present invention are not limited to any particular type or number of storage systems and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

Figure 3:
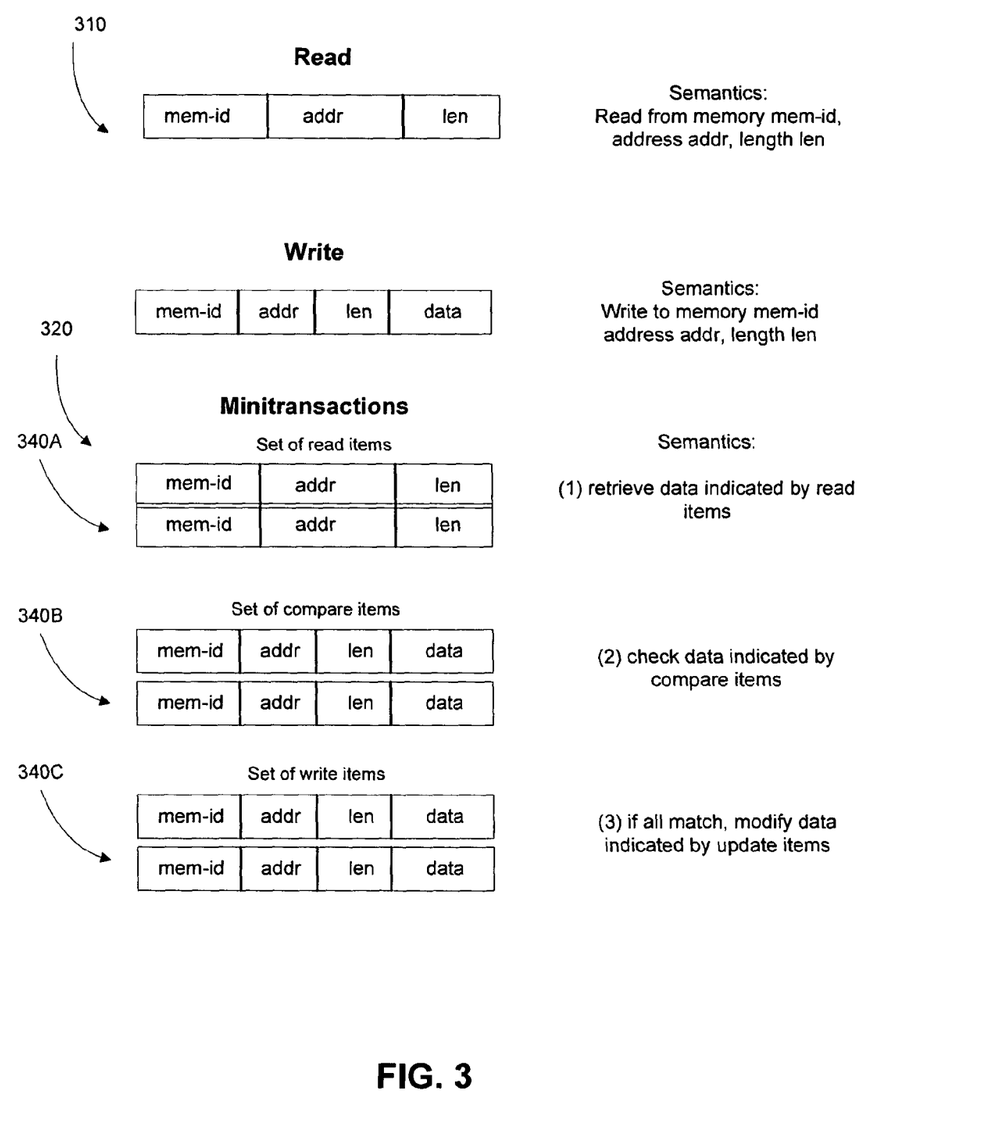
FIG. 3 is an exemplary block diagram for data access mechanisms in accordance with an exemplary embodiment of the present invention.

Embodiments in accordance with the present invention provide users with multiple address spaces on various storage nodes where application data is shared among the cluster nodes. As shown in FIG. 3, applications access data through read-write operations 310 and minitransactions 320.

A read or write operation 310 takes as input a mem-id to indicate a storage node, and an address range to indicate the addresses within the storage node. A write operation also takes as input the data to be written. A read operation returns a status indicating any errors. If no errors exist, then the read operation also returns the data requested. A write operation just returns a status. In one exemplary embodiment, read and write operations operate on a single storage node, but for that node, their effect is atomic. To atomically read or write data on multiple storage nodes, a minitransaction is used.

Minitransactions atomically handle data in many storage nodes. Generally, minitransactions include three sets of items: a read set 340A, a compare set 340B, and a write or update set 340C. An item in each set includes a mem-id, an address range, and possibly some data (read items have no data). The read set 340A indicates locations whose data is to be returned. The compare set 340B has locations to be tested against provided data; the test is equality comparison. The write or update set 340C has locations to be updated if all the comparisons evaluate are true. If addresses in the read set overlap with those in the update set, the data returned is the data before the updates. Each item has an item id, which is used for matching responses with the item. Compare items have a boolean flag to request the current contents if the request fails.

The response of a minitransaction is a commit or abort indication for the minitransaction and, for each compare item, an indication of whether the comparison failed or succeeded and optionally the data of the item if the comparison failed. A minitransaction only commits if all comparisons succeed, but the converse is not required to be true: a minitransaction may abort even if all comparisons succeed when another conflicting minitransaction concurrently executes. In these cases, the status of some compare items are set to unknown, and the optional data is returned.

If the compare set is empty and the read and update sets have the same addresses, an atomic swap operation occurs that writes data and returns the old contents. If the read set is empty and the compare set and update set have the same addresses, an atomic compare-and-swap operation occurs. If the compare set and update set are empty, an atomic read occurs. And if the compare set and read set are empty, an atomic write occurs. Atomic write of multiple storage nodes (using a minitransaction) is different from multiple concurrent writes to each node (using read-write service) because the multiple concurrent writes take effect at slightly different times and allow a window where reads from different nodes return a mix of new and old data. Similarly, an atomic read of multiple storage nodes (using a minitransaction) is also different from multiple concurrent reads (using read-write service) because the concurrent reads take effect at slightly different times.

Minitransactions are useful for local caching and optimistic concurrency control. An exemplary use of the compare items is to check a version number of some cached data against the version of the global copy in the SSS. If the comparison fails, indicating that the cached copy is out of data, the minitransaction is aborted.

In one exemplary embodiment, the SSS builds a file system that is shared among multiple nodes in a cluster. The file system tolerates crash failures of nodes in the cluster without losing integrity and without requiring utilities (such as a file system checker) to check and fix the file system. In one exemplary embodiment, the file system scales its performance to support the addition of more cluster nodes.

Figure 4:
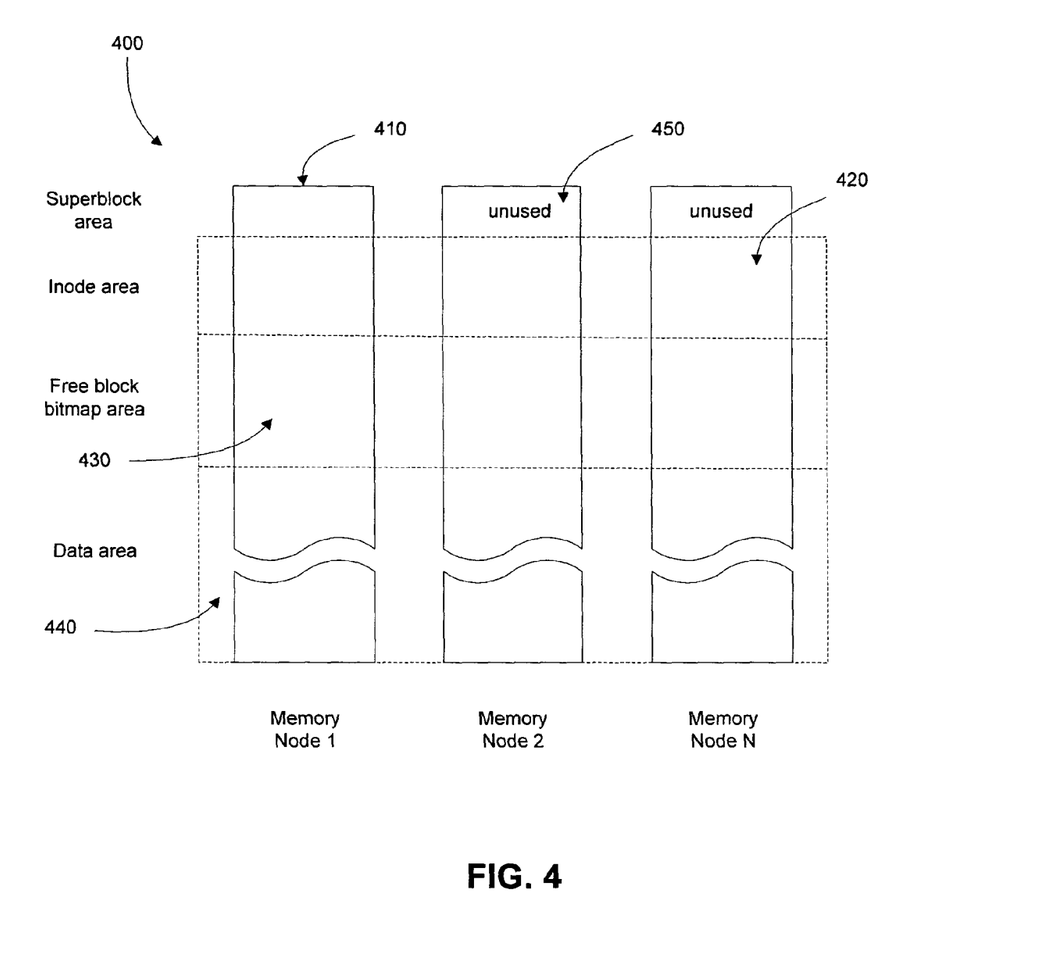
FIG. 4 is an exemplary data layout for a cluster file system application in accordance with an exemplary embodiment of the present invention.

The SSS maintains file system data that is striped across storage nodes for scalability. Thus, the nodes in the cluster file system correspond to the SSS cluster nodes (see FIG. 1). FIG. 4 shows an exemplary data layout 400 for a cluster file system application. Data in storage nodes are arranged in blocks of fixed size (example, 16 KB) and organized in four different areas. First, a superblock 410 indicates the name of volume, number of data blocks, and number of inodes. Second, inode areas 420 keep the attributes of files, such as type, access mode, owner, and timestamps. Inodes also have the number of the first chaining block, explained below. Third, a free block bitmap area 430 indicates which data blocks are in use. Fourth, data block areas 440 maintain the contents of files. The storage nodes can also comprise an unused area 450. These areas are discussed in more detail below.

The superblock 410 stores static information about the entire file system, including, but not limited to, the name and identification of the volume, the size of the file system, and the maximum number of inodes. In one exemplary embodiment, the superblock is only stored in one storage node; the corresponding space in other storage nodes is unused. Further, in one exemplary embodiment, the superblock is a static structure that does not change after the file system is created.

The inode area 420 stores all inodes in the system. Since this area is pre-allocated when the file system is created, there is a limit on the maximum number of allocated inodes. Each inode includes, for example, the following fields: type, access mode, owner, group owner, size, creation timestamp, access timestamp, modification timestamp, number of links, number of first chaining block, and version numbers. A special value for the type field indicates that the inode is unallocated. Inodes are striped across storage node. Inodes are referenced by a 32-bit mode number that has two parts: a storage node number (7 bits) and a number within the storage node (25 bits). This structure allows for 33 million inodes per storage node and 128 storage nodes.

In the free block bitmap area 430, there is a bit for each block in the storage node to indicate if it is free or allocated.

The data area 440 stores the contents of files and is divided in blocks of 16 KB, which avoids too much external fragmentation and allows shorter references to locations. The data area is striped across storage nodes. Blocks are referenced by a block number that includes a storage node number (7 bits) and a number within the storage node (25 bits). This structure allows for 512 GB of data per storage node. Other systems can utilize more bits (example, 64) for block numbers or increase the block size.

The list of blocks comprising a file is kept in chaining list blocks that are stored in data blocks. Each chaining block has a fixed-size list of data blocks and a pointer to the next chaining block in the chaining list. In general, an inode, its chaining list, and its file contents are stored in different storage nodes, but the SSS or cluster tries to place them in the same node for locality. This organization allows minitransactions to involve fewer storage nodes, and provides better scalability of performance.

To modify data structures, a node in the cluster uses minitransactions to make multiple atomic updates while maintaining data structure integrity. For example, a node uses a minitransaction to atomically mark a data block as in use in the free block bitmap, and add the data block to the chaining list of an inode. Thus, minitransactions perform at least the following two functions. First, if some node crashes during the minitransactions, partial updates do not occur since a minitransaction either commits in full or aborts. Second, if two nodes are attempting to update the same data structures, inconsistencies do not occur since one of the minitransactions will abort. Nodes in the cluster keep a cache with data and metadata. Further, to ensure consistency, minitransactions validate the contents of caches (using compare items) as a condition to commit changes to the file system. For example, if the condition fails, then the cache at the node is stale. In this instance, the cache refreshes before the node retries the minitransaction.

In one exemplary embodiment, the SSS assists in the design of the cluster file system in at least four ways. First, nodes in the cluster need not coordinate and orchestrate updates; in fact, nodes are not aware of the existence of other nodes. Specifically, the SSS provides atomic updates without cluster nodes experiencing conflicting accesses. Second, cluster nodes are not required to keep journals to recover from crashes in the middle of updates. Third, cluster nodes are not required to maintain the status of caches at remote nodes, which often requires complex protocols that are difficult to scale. And fourth, the implementation does not require a sequential log to improve performance.

The cluster file system includes a set of nodes (i.e., computers or devices connected to a computer network) in a cluster, and the nodes are connected together, for example through a high-speed network. In one exemplary embodiment, cluster file system exhibits one or more of the following:

(1) Nodes are able to access the same content at the same time.
(2) Updates performed by a node are quick and visible to other nodes (example, occur within a bounded and known delay, such as a few seconds or less).
(3) If a node in the cluster fails while performing updates to the file system, file system data structures are not damaged, and other nodes continue to use the file system normally.
(4) The set of nodes in the cluster is able to grow or shrink (if desired), and new nodes have prompt access to the file system.

In one exemplary embodiment, the nodes in the cluster file system are clients that store the file system and its inner structures in storage nodes. Each of the basic file system operations, like lookup, read, write, etc. involves changing some file system data structure and returning a result.

The changes to the data structures are performed through minitransactions, and the result is obtained by reading, for example, a local cache. Local caches are validated if their contents are older than a parameter called freshness-delay (i.e., updates take up to freshness-delay to be visible at all nodes, such as three seconds as a reasonable compromise between performance and speed of updates). This cache validation is performed through the same minitransaction that modifies the data structures (if the data structure exists).

In one exemplary embodiment, the file system is exposed to users through a local Network File System (NFS) interface. For example, each node in the cluster runs an NFS server that only gets accessed locally, and the file system is accessed by users through the NFS mount point. The file system is built in user space by implementing each of the NFS procedures. In alternate embodiments, other interfaces are utilized, such as a kernel-level interface (example a virtual file system (VFS) in Linux) that could shorten the code path and reduce buffer copying between the user and the file system.

Some blocks in the data area are chaining list blocks that maintain a list of blocks comprising a file. Each chaining list block also includes a pointer to the next block in the list (or null if there are none). For example, a 4 GB file requires only 65 chaining blocks (each chaining block holds 4095 block numbers). A richer pointer structure for chaining blocks (like indirect blocks) is utilizable if desired. The file system supports files with holes, which are blocks in the middle of the file that have never been written and are not even allocated. Holes are represented by zeros in the chaining list.

The contents of directories and symbolic links are stored in data blocks. The contents of directories consist of a list of entries, where each entry is a file name and an associated inode number. In one exemplary embodiment, entries have a fixed size, and so file names have a maximum length. More elaborate schemes are possible (example, have a flag to extend a file name of an entry into the next entry). As another example, special support for small files are implemented, like allowing a small number of bytes of file content to be stored in the inode. Exemplary embodiments also support files with holes (i.e., blocks in the middle of the file that have not been allocated) by having zero entries in the chaining list of the file.

For efficiency, nodes in the cluster keep a cache with the contents of the superblock, inodes, the free block bitmap, and the content of files. In one embodiment, caching the superblock is straightforward because its contents never change. For the other data structures, nodes validate the contents of their cache before acting upon them, to avoid using content that is out of date.

Each inode stores a number called the iversion for inode version. The iversion is incremented every time the inode changes. When the node needs to act upon the contents of an inode in its cache, the node checks the iversion against the SSS. If a mismatch exists, the inode is reloaded into cache. In order to perform this checking or verification, an extra compare item is added to the current minitransaction.

Inodes also have a generation number, called the igeneration. This number is incremented when the inode is deallocated and subsequently reallocated. Thus, igenerations distinguish between different inodes that have the same inode number, while iversions distinguish between different states for the same inode. The reason for differentiating is that there are file system functions that return an error if operating on a different igeneration, but not a different iversion. For example, if a node wishes to delete a file, but another node manages to delete the file first and creates a new one with the same inode number, then the first node should not cause the new file to be deleted.

A change in the igeneration allows this scenario to be detected, but the iversion is not adequate for this purpose, since the iversion changes with any changes to the inode, including just a change in timestamps. One exemplary embodiment allocates 32 bits for iversions and igenerations and allows them to wrap around.

Inodes also store a number called the dversion for data version. This number is incremented every time the file contents change. Like iversions and igenerations, dversions are tested in minitransactions to validate cached data that is being acted upon. In one embodiment, the version numbers are not used to validate the free block bitmap, but instead use its own content in the minitransaction. For example, to allocate a new block that a node believes to be free (according to its cached free block bitmap), a minitransaction includes a test to check that the block is indeed free. Because minitransactions cannot test bits individually, they instead test the whole byte containing the bit. This test can cause the minitransaction to occasionally abort even if the block is free, if the other bits do not match. If an abort occurs, the process retries with a new minitransaction.

In one exemplary embodiment, a node in the cluster executes each basic file system function often with only a single minitransaction. In one exemplary embodiment, the file system is implemented as an NFS server, and so the basic functions correspond to NFS remote procedure calls, like lookup, create, read, write, readdir, mkdir, rmdir, unlink, setattr, getattr, etc. The examples below explain the implementation of a few of those procedures, which are selected as an exemplary or representative set that includes some complex procedures (procedures not discussed can be extrapolated from the information provided here).

One procedure changes the attributes of an inode. This operation requires checking if the inode still exists (it has not been deleted) and, if so, atomically modifying the requested attributes, like owner, group owner, or timestamps. To do this, a node uses a minitransaction that verifies the igeneration of the inode against the cached version (if the inode is not cached, it is loaded from the SSS) and then modifies the necessary attributes.

Another procedure creates new files. This operation allocates a new inode, allocates a new directory entry for the file, populates the inode, and populates the directory entry so that it contains the file name and the number of the new inode. A node does this process as follows:

(1) look for a free inode in its cache, populate it, and increase its igeneration;
(2) load in cache the inode and contents of the file's parent directory (if it is not in cache yet);
(3) find a free directory entry, populate it, and increase the iversion of the directory;
(4) issue a minitransaction where (a) the compare items check the cached iversion of the new inode and the cached iversion and dversion of the parent directory, (b) the update items update the new inode, the directory inode, and the contents of the directory;
(5) if the minitransaction succeeds, the operation is complete, otherwise the minitransaction fails because some iversion or dversion check mismatched, so the node reloads its cache, and restarts from the beginning.

Another exemplary procedure renames files within a directory. Renaming a file changes an entry in the directory where the file resides. First, a node loads its cache with the directory's inode and contents (if it is not in the cache yet). Then, the node looks for the old file name in the cached directory, replaces it with the new name, increments the directory inode's iversion and dversion in cache, and modifies the directory inode's last-modification timestamp in cache. Finally, the node issues a minitransaction whose compare items check the iversion and dversion of the inode. The update items updates the SSS with the changes made in cache, namely, they modify the proper inode fields (last-modification timestamp, iversion, and dversion) and modify the contents of the directory. If the minitransaction fails, the node checks the reason, reloads parts of its cache as appropriate, and starts over. Otherwise, the operation is complete.

Another exemplary procedure deletes inodes. Deleting an inode changes the inode type to a special value indicating it is free. The node issues a minitransaction that checks the igeneration of the inode and changes its type appropriately. If the igeneration check fails, an error is returned (example in NFS, this error is a stale filehandle error that indicates the user has chosen a file that no longer exists).

In another procedure, the contents of a file are read. To read the contents of a file (or parts thereof), the node first loads in its cache the file's inode and chaining list (if it is not there already). Loading the chaining list includes loading the various blocks that constitute it: the first block is indicated by the inode, and the other blocks are linked in a linked list. The node then issues a minitransaction that (1) checks the validity of cached data by comparing the iversion, igeneration, and dversion, and (2) reads the data blocks with the desired contents according to the chaining list. If the minitransaction fails because the igeneration does not match, the function returns an error (example, stale filehandle). If the minitransaction fails because the iversion or dversion do not match, indicating that cached data is stale, then the node reloads its cache and retries. Otherwise, the read contents are returned with a success indicator.

In another procedure, a file is modified. In one exemplary embodiment, file modifications do not require an allocation of new blocks for the file. In this instance, a node loads the file's inode and its chaining list in its cache (if it is not there already). The node then issues a minitransaction that checks the cached inode's iversion, igeneration, and dversion, modifies the data contents at the places specified by the chaining list, and updates the inode's iversion, dversion, and time of last update. If the minitransaction fails because the igeneration does not match, then an error is returned (example, stale filehandle). If the minitransaction fails because the iversion or dversion do not match, then the node reloads its cache and retries. Otherwise, a success indicator is returned.

In yet another procedure, data is appended to a file. For instance, in order to append new blocks to a file, a node first loads the file's inode and its chaining list in its cache (if they are not there already). Then, the node consults its cached free-block bitmap to find a new free block. The node then issues a minitransaction that checks the iversion, igeneration, and dversion of the cached inode, checks the free status of the new block, updates the inode's iversion and dversion, appends the new block to the inode's chaining list, and populates the new block. If the minitransaction fails because the igeneration does not match, then an error is returned (example, stale filehandle). If the minitransaction fails because the iversion or dversion do not match, then the node reloads its cache and retries. Otherwise, a success indicator is returned.

The above explanation assumes that there is no need to allocate a new block to the chaining list. If a new block is needed, then the minitransaction also includes update items to add the new block and includes a check to verify the allocated block is actually free.

In order to implement file system operations, one exemplary embodiment uses a general template to: (1) load into cache whatever information is needed (if it is not already there), (2) modify in cache the appropriate data structures, and (3) issue a minitransaction that checks the validity of cached data against the SSS and, if valid, update the SSS data structures according to the local changes; (4) if the minitransactions fails, check the reason why and, if appropriate, reload stale cache entries and retry, or return an error indicator; (5) if the minitransaction succeeds, return a success indicator together with any relevant results. Note that in the common cases when the cache is loaded with valid data, interactions with the SSS occur through a single minitransaction. This template provides an optimistic concurrency control wherein the optimistic changes executed in step (2) are quickly performed in memory.

Users of the SSS are subject to two forms of contention: storage node contention and location contention. Storage node contention occurs when cluster nodes access data in the same storage node, but not necessarily in the same location. This situation results in degradation of performance as the storage node becomes overloaded. Location contention occurs when cluster nodes access data in the same location and storage node. Location contention implies storage node contention, but can additionally cause minitransactions to abort. If an abort occurs, then the minitransaction is retried.

Embodiments in accordance with the present invention avoid storage node and location contentions. In one embodiment, these contentions are avoided by distributing load across storage nodes. To address location contention, data structures are organized so as to avoid frequent global access to a few locations (hotspots). For the cluster file system, two techniques are used. First, equivalent structures are distributed across storage nodes. For instance, the many inodes and free blocks are distributed over storage nodes to balance their load. Second, allocations are random when contentions are detected. For instance, when allocating a new inode or block, if a node detects location contention then it randomly picks another free inode or block to retry. In one exemplary embodiment, randomness is used only in case there is location contention, to try to maintain some locality of data (i.e., allocating sequential data blocks for the same file.) The node detects location contention when a minitransaction aborts due to a comparison failure for the allocation being attempted.

The random allocation technique does not require cluster nodes to know about each other, and tends to distributes load fairly well if the file system is not nearly full. Optimizing file system performance for this case is effective because the current low cost of storage allows for spare capacity in the file system.

Fault tolerance of the cluster file system is inherited from the SSS. Because data in the file system are kept in the SSS storage nodes, data survives crashes of nodes in the file system cluster. Because those nodes perform updates using minitransactions, partial updates that invalidate data structures are avoided.

Exemplary embodiments enable nodes to be added to or removed from the cluster seamlessly, because nodes do not communicate with or need to be aware of each other. Further, in one exemplary embodiment, all necessary coordination happens through the SSS. This architecture avoids expensive quadratic communication that arises from every node in the cluster talking to each other, and obviates the need for mechanisms for nodes to join the cluster.

Embodiments in accordance with the present invention are utilizable with various infrastructures that support or provide minitransactions or equivalent mechanisms. Exemplary embodiments, for instance, are usable with file systems or services that provide minitransactions that atomically check and update data items when these data items are stored in one or more multiple locations (example, across one or more networks).

One exemplary embodiment uses a distributed file system to implement network-attached storage (NAS) service with multiple heads. For instance, in a NAS service, one or more hosts (called NAS heads) provide access to a file system to client computers in the network. These clients access the file system by issuing file-level requests to the NAS heads. Current available NAS services only allow a single head for each file system, which becomes a performance bottleneck. One exemplary embodiment in accordance with the present invention provides a NAS service with multiple heads for each file system (i.e., a multi-headed NAS). In this embodiment, each NAS head runs a distributed file system enabled with embodiments of the present invention.

In one exemplary embodiment, the distributed file system does not support all operations found in most file systems. For example, hierarchical directories are not necessary. Instead, files are stored in a small number of folders that do not form a hierarchy. For instance, files are stored in a flat address space. Further, the distributed file system also supports operations such as searching of data contents, indexing, and anti-viral protection, to name a few examples.

The distributed file system in accordance with the present invention also supports various types of security schemes to prevent unauthorized accesses. For instance, the minitransactions have one or more security mechanisms (example, minitransactions are restricted to run only on specified hosts). In this example, file system access is restricted to those specified hosts. Alternatively, minitransactions are restricted to be read-only for some hosts (example, update or write items not allowed). In this example, the specified hosts receive only read access or read privileges to the file system.

In further exemplary embodiments, the hosts of the distributed file system are not required to be homogenous. In other words, hosts have different memory sizes and processors and run different operating systems. Further, such hosts can be general purpose computers, appliances, or components of a general purpose computer.

The network connecting storage and cluster nodes are any medium, device, or mechanism that allows nodes to communicate. Further, these nodes are not required to be homogenous or unique. Multiple different networks can connect the storage and cluster nodes, where each network has different characteristics. For example, one network uses wires, another uses radio transmissions, etc. Further, portions of the networks can have different bandwidths, latencies, packet sizes, access mechanisms, reliability protocols, and ordering guarantees, to name a few examples.

As used herein, an "inode" is a data structure that contains information about files (such as basic information about a regular file, directory, or other file system object). Inodes include information on files, such as, but not limited to, user ownership, access mode (read, write, execute permissions) and type. In one exemplary embodiment, each file has an inode and is identified by an inode number (i-number) in the file system where it resides.

As used herein, a "file system" is a system that a program or operating system uses to manage and track files. Further, as used herein, a "cluster" is a set of one or more nodes (example, hosts) connected together.

As used herein, an "atomic" transaction is a database transaction that either completely commits (i.e., occurs) or does not commit (i.e., does not occur or is rolled back). In atomic transactions, partial updates to the database do not occur. Thus, atomicity preserves invariants in the system even when one or more operations fail. Thus, atomic operations are performed entirely or not performed at all. For instance, a processor simultaneously reads a location and writes the location in the same bus operation to prevent other processors or I/O devices from writing or reading memory until the operation is complete.

As used herein, a "distributed file system" stores, accesses, and retrieves files on one or more storage nodes that are accessible over a network. Distributed file systems include cluster file systems.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of software execution by a computer, comprising:
   using, by the computer, minitransactions that include a set of compare items and a set of write items stored in a host to atomically modify data structures in storage nodes of a distributed file system;
   validating, by the computer, cached data stored in the host by comparing a version number of an inode stored in the host with a version number of the inode stored in one of the storage nodes; and allowing, by the computer, the host to write to the data structures with the cached data when the version number of the inode stored in the host matches the version number of the inode stored in the one of the storage nodes.

2. The method of claim 1 further comprising, including with the set of compare and write items (1) a memory identification that identifies a storage node to be atomically modified, (2) an address specifying a location in the storage node, and (3) data.

3. The method of claim 1 further comprising, incrementing the version number of the inode stored in the one of the storage nodes each time data in the inode changes.

4. The method of claim 1, wherein the inode includes at least fields of size, type, and owner.

5. The method of claim 1 further comprising, modifying the data structures by updating an inode area and a data area in the data structures.

6. The method of claim 1 further comprising, reloading the inode stored in the one of the storage nodes into the host when the version number of the inode stored in the host does not match the version number of the inode stored in the one of the storage nodes.

7. The method of claim 1 further comprising, comparing data in the set of compare items for equality against a virtual address specified in the set of compare items such that if a comparison succeeds, then copying data from the set of write items to a storage node in the distributed file system.

8. A non-transitory computer readable medium having instructions for causing a computer to execute a method, comprising:
   forming at least one storage node that includes (1) an inode area having attributes of files in the storage node and (2) a data block area storing contents of the files;
   adding the storage node to a distributed file system in which a set of cluster nodes share files;
   storing contents of the inode area in one of the cluster nodes;
   determining that data stored in a cache of the one of the cluster nodes is valid by comparing contents of the inode area stored in the one of cluster nodes with contents of the inode area stored in the storage node;
   using the data stored in the cache to perform a write operation in the distributed file system when the data stored in the cache is valid; and
   changing attributes of the inode area by atomically modifying attributes of the inode area with a single minitransaction that verifies a version number in the inode area against a cached inode version number.

9. The non-transitory computer readable medium of claim 8 further comprising, forming the storage node with (3) a bitmap area that indicates which data blocks are being used in the storage node, and (4) a superblock region that includes static information about a volume of the storage node.

10. The non-transitory computer readable medium of claim 8 further comprising, using minitransactions that include a set of compare items and a set of write items to atomically modify a data structure of the distributed file system.

11. The non-transitory computer readable medium of claim 8 further comprising:
   issuing minitransactions to check an iversion of a cache inode, check free status of a new storage block, update iversion and dversion numbers of an inode, and populate the new storage block with data.

12. The non-transitory computer readable medium of claim 8 further comprising, storing an inode, a chaining list for the inode, and file contents in a same storage node.

13. The non-transitory computer readable medium of claim 8 further comprising, atomically marking the data block in the bitmap area as not available for write operations, and adding the data block to a chaining list in the inode area.

14. The non-transitory computer readable medium of claim 8 further comprising creating a new file in the distributed file system by (1) allocating a new inode, (2) allocating a new directory entry for the new file, (3) populating the new directory entry, and (4) issuing a minitransaction to verify that the new file does not already exist in the distributed file system.

15. A computer system, comprising:
   a memory for storing an algorithm; and
   a processor for executing the algorithm to:
      transmit minitransactions between cluster nodes and storage nodes in a distributed file system, wherein the minitransactions include a set of compare items and a set of write items that atomically modify data structures in the distributed file system, and the minitransactions compare data of two inodes to validate contents of cached data stored in the cluster nodes by comparing a version of an inode stored in a host of the distributed file system with a version number of the inode stored in one of the storage nodes to allow the cluster nodes to modify the data structures with the contents of the cached data when the version number of the inode stored in the host matches the version number of the inode stored in the one of the storage nodes.

16. The computer system of claim 15, wherein the processor further executes the algorithm to implement a network-attached storage (NAS) service with multiple heads for each one of plural file systems.

17. The computer system of claim 15, wherein a minitransaction aborts if either (1) comparisons between the compare items and cached data do not match or (2) another minitransaction attempts to concurrently execute a conflicting transaction to a file system data structure.

18. The computer system of claim 15, wherein the storage nodes include (1) a superblock region for storing static information about the file system, (2) a bitmap region for indicating if blocks in a data region are available, (3) an inode list for storing contents of an inode, and (4) a file data region for storing data content of inodes and chaining lists.

19. The computer system of claim 15, wherein the minitransactions protect two different hosts from performing conflicting updates to the storage nodes by (1) determining if an inode and directory entry are free, (2) marking the inode and directory entry as being used, and (3) populating the inode and directory entry.

* * * * *